(12) United States Patent
Hom et al.

(10) Patent No.: US 8,805,881 B2
(45) Date of Patent: Aug. 12, 2014

(54) REPUTATION BASED ACCESS CONTROL

(75) Inventors: Richard V. Hom, Troy, MI (US); David C. Roxin, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/775,410

(22) Filed: May 6, 2010

(65) Prior Publication Data

US 2011/0276604 A1 Nov. 10, 2011

(51) Int. Cl.
G06F 17/30 (2006.01)

(52) U.S. Cl.
USPC .......................................... 707/783

(58) Field of Classification Search
CPC ................................................ H04L 29/06823
USPC .................................................. 707/784, 783
See application file for complete search history.

(56) References Cited

U.S. PATENT DOCUMENTS

| | | | |
|---|---|---|---|
| 6,615,253 B1 | 9/2003 | Bowman-Amuah | |
| 6,766,314 B2 | 7/2004 | Burnett | |
| 7,552,110 B2 | 6/2009 | Hrle et al. | |
| 7,568,097 B2 | 7/2009 | Burnett | |
| 7,698,255 B2 | 4/2010 | Goodwin et al. | |
| 7,698,303 B2 | 4/2010 | Goodwin et al. | |
| 8,021,163 B2* | 9/2011 | Forman ........................ | 434/322 |
| 2002/0147706 A1 | 10/2002 | Burnett | |
| 2003/0083891 A1* | 5/2003 | Lang et al. ........................ | 705/1 |
| 2005/0005079 A1 | 1/2005 | Boudou et al. | |
| 2006/0212931 A1* | 9/2006 | Shull et al. ....................... | 726/10 |
| 2007/0006326 A1 | 1/2007 | Redlich et al. | |
| 2007/0101436 A1 | 5/2007 | Redlich et al. | |
| 2008/0005223 A1* | 1/2008 | Flake et al. .................... | 709/203 |
| 2008/0183538 A1* | 7/2008 | Hamadi et al. .................... | 705/8 |
| 2009/0024574 A1 | 1/2009 | Timmons | |
| 2009/0204471 A1* | 8/2009 | Elenbaas et al. .................. | 705/9 |
| 2009/0265551 A1 | 10/2009 | Tripunitara et al. | |
| 2009/0300720 A1* | 12/2009 | Guo et al. ........................ | 726/3 |
| 2010/0077445 A1* | 3/2010 | Schneider et al. ................ | 726/1 |

OTHER PUBLICATIONS

Eric Yuan & Jin Tong, "Attributed Based Access Control (ABAC) for Web Services", Proceedings of IEEE Conference on Web Services (2005).*

Donovan Artz & Yolanda Gil, "A Survey of Trust in Computer Science and the Semantic Web", Web Semantics: Science and Agents on the World Wide Web 5 (2007), pp. 58-71.*

Phillip J. Windley et al., "Using Reputation to Augment Explicit Authorization", ACM DIM (Nov. 2007), pp. 72-81.*

(Continued)

Primary Examiner — Rehana Perveen
Assistant Examiner — Scott A Waldron
(74) Attorney, Agent, or Firm — John R. Pivnichny; Keohane & D'Alessandro, PLLC (57) ABSTRACT

The reputation based access control system of the present invention allows or denies access to a requested controlled resource to a requesting subject based upon predetermined associations between the resource and security contexts to determine the subject's reputation in those contexts. The reputation based access control system utilizes an authentication system (biometric, challenge/response, etc.) to identify a subject. Once the identity is determined, a resource to be accessed is determined by a reputation based access control unit. The system interfaces with a reputation assessment system to gauge the subject's reputation in these contexts. If the subject's reputation meets the predetermined limits for reputation in those contexts for that resource, the subject is allowed access to the resource. Otherwise access is denied and the proper agents are notified.

19 Claims, 5 Drawing Sheets

(56) References Cited

OTHER PUBLICATIONS

Hassan Takabi et al., "Trust-Based User-Role Assignment in Role-Based Access Control", IEEE AICCSA (2007), pp. 807-814.*

Li Yang & Alma Cemerlic, "Integrating Dirichlet Reputation into Usage Control", ACM CSIIRW (Apr. 2009).*

Jason Crampton & Michael Huth, "Towards an Access-Control Framework for Countering Insider Threats", printed in "Insider Threats in Cyber Security", Springer Publishing (Jan. 2010), pp. 173-195.*

Jennifer Golbeck & James Hendler, "Accuracy of Metrics for Inferring Trust and Reputation in Semantic Web-Based Social Networks", 2004, appearing in Engineering Knowledge in the Age of the Semantic Web, Springer-Verlag Berlin Heidelberg publisher, pp. 116-131.*

* cited by examiner

FIGURE 5   REPUTATION BASED ACCESS CONTROL UNIT

REPUTATION BASED ACCESS CONTROL

RELATED APPLICATIONS

The following application, commonly-owned with this one, filed on Jun. 15, 2010, having U.S. patent application Ser. No. 12/815,431, entitled "PARTY REPUTATION AGGREGATION SYSTEM AND METHOD", and having issued as U.S. Pat. No. 8,359,328 on Jan. 22, 2013, is hereby incorporated by reference in its entirety for all purposes.

FIELD OF THE INVENTION

Aspects of the present invention provides for a method and a system for reputation based access control for accessing requested controlled resources by requesting subjects based upon the reputation of the requesting subject and the requested controlled resource's access policy.

BACKGROUND OF THE INVENTION

When a subject (e.g., person, software, etc.) becomes a suspected security risk, enterprises may need to immediately suspend access of the suspected subject to controlled resources. These resources may be physical (e.g., buildings, vehicles, machinery, weapons, etc.) or virtual (e.g., web services, applications, etc.). A subject may become a suspected security risk for any number of reasons that may be assessed through the reputation of the subject. The following examples show cases where the reputation of the subject may be built and then used to determine whether the subject is a suspected security risk:
  If a subject is a known security risk, that subject's affiliates may become suspect. If the consequences are grave enough and the subject's security risks are high enough, the subject's affiliates or associates may immediately become suspect.
  Based the feedback of a peer A, subject's trust may need immediate re-evaluation.
  A subject may become a security risk if the subject's skill level in an area becomes diminished (e.g., subject is intoxicated).

The current solution is for a superior to evaluate each subject and to deny access based on a personal decision. This control does not happen instantaneously, is based on the superior's biases, and requires the superior to have access to a control system.

Therefore, there exists a need for a solution that solves at least one of the deficiencies of the related art.

SUMMARY OF THE INVENTION

Security risk may be assessed based on using a combination of a rule based system in conjunction with reputation metrics. These reputation metrics may include trust levels and skill levels that may be tied to specific contexts. Rules that specify minimum (or maximum depending on the policy) reputation metrics for given contexts will provide or deny access to resources. In a sense, the metrics become virtual attributes in an Attribute Based Access Control (ABAC) system. The solution of the present invention has the advantage of instantaneous assessment without the decision making of a superior. If subject A reports subject B has diminished skill level, that subject could be denied access to heavy machinery. If Subject B is affiliated with known security risk Subject A, then Subject B is denied access to buildings, etc.

Therefore, one aspect of the present invention comprises a method in a computer system having a network I/O, a CPU, a reputation based access control unit and one or more databases including a reputation based access control database, the method for assessing allowability of allowing or denying access to a requested controlled resource having a policy from a request from a requesting subject having a reputation based upon the requesting subject's reputation and the requested controlled resource's policy, the method comprising identifying the requesting subject, retrieving the requesting subject's reputation, identifying the requested controlled resource, retrieving the requested controlled resource's policy, associating the requesting subject's reputation with the requested controlled resource's policy, determining if the requesting subject's reputation meets the requested controlled resource's policy, if the requesting subject's reputation meets the requested controlled resource's access policy, allowing the requesting subject to access the requested controlled resource, and if the requesting subject's reputation does not meet the requested controlled resource's access policy, denying the requesting subject to access the requested controlled resource.

Another aspect of the present invention comprises a system having a network I/O, a CPU and one or more databases for assessing allowability of access to a requested controlled resource, the requested controlled resource having an access policy, from a request for access to the requested controlled resource from a requesting subject, having a reputation, the assessment being based upon the requesting subject's reputation and the requested controlled resource's access policy, the system comprising a reputation based access control database for storing access policies for access to one or more controlled resources, the reputation based access control database comprising a subject reputation database for storing reputation information relating to one or more requesting subjects, and a controlled resource access policy database for storing the access policies of one or more requested controlled resources, a reputation based access control unit for controlling access to the controlled resources, the reputation based access control unit comprising a subject reputation database access unit, connected to the subject reputation database, for retrieving the subject reputation information stored in the subject reputation database, a controlled resource access policy database access unit, connected to the controlled resource access policy database, for retrieving the access policies of the one or more requested controlled resources, a controlled resource request receiver for receiving requests from subjects and for forwarding the received requests to the subject reputation database access unit and the controlled resource access policy database access unit, an association unit for associating the subject reputation information of a requesting subject and the reputation information relating to the requesting subject using predetermined associations, and a subject/controlled resource clearance unit for determining, based upon the association between the requesting subject's reputation information and the requested controlled resource's access policy, clearing or not clearing the requesting subject for access to the controlled resource, wherein the requesting subject is allowed to access the requested controlled resource if the requesting subject's reputation information meets the access requirements of the requested controlled resource and is denied access to the requested controlled resource if the requesting subject's reputation information does not meet the access requirements of the requested controlled resource.

Another aspect of the present invention comprises a computer program product embodied in a computer readable medium for operating in a system comprising a network I/O, a CPU, a reputation based access control unit and one or more databases including a reputation based access control database, the method for assessing allowability of allowing or denying access to a requested controlled resource, having and access policy, from a request from a requesting subject, having a reputation, based upon the requesting subject's reputation and requested controlled resource's access requirements, the method comprising identifying the requesting subject, retrieving the requesting subject's reputation, identifying the requested controlled resource, retrieving the requested controlled resource's access requirements, associating the requesting subject's reputation with the requested controlled resource's access requirements, determining if the requesting subject's reputation meets the requested controlled resource's access requirements, if the requesting subject's reputation meets the requested controlled resource's access requirements, allowing the requesting subject to access the requested controlled resource, and if the requesting subject's reputation does not meet the requested controlled resource's access requirements, denying the requesting subject to access the requested controlled resource.

Yet another aspect of the present invention comprises a method for deploying a computer infrastructure in a system comprising a network I/O, a CPU, a reputation based access control unit and one or more databases including a reputation based access control database, for implementing a process for assessing allowability of allowing or denying access to a requested controlled resource, having an access requirements, from a request from a requesting subject, having a reputation, based upon the requesting subject's reputation and requested controlled resource's access requirements, the process comprising identifying the requesting subject, retrieving the requesting subject's reputation, identifying the requested controlled resource, retrieving the requested controlled resource's access requirements, associating the requesting subject's reputation with the requested controlled resource's access requirements, determining if the requesting subject's reputation meets the requested controlled resource's access policy, if the requesting subject's reputation meets the requested controlled resource's access policy, allowing the requesting subject to access the requested controlled resource, and if the requesting subject's reputation does not meet the requested controlled resource's access policy, denying the requesting subject to access the requested controlled resource.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, is a method and system for reputation based access control for accessing requested controlled resources by requesting subjects based upon the reputation of the requesting subject and the requested controlled resource's access policy.

Figure 1:
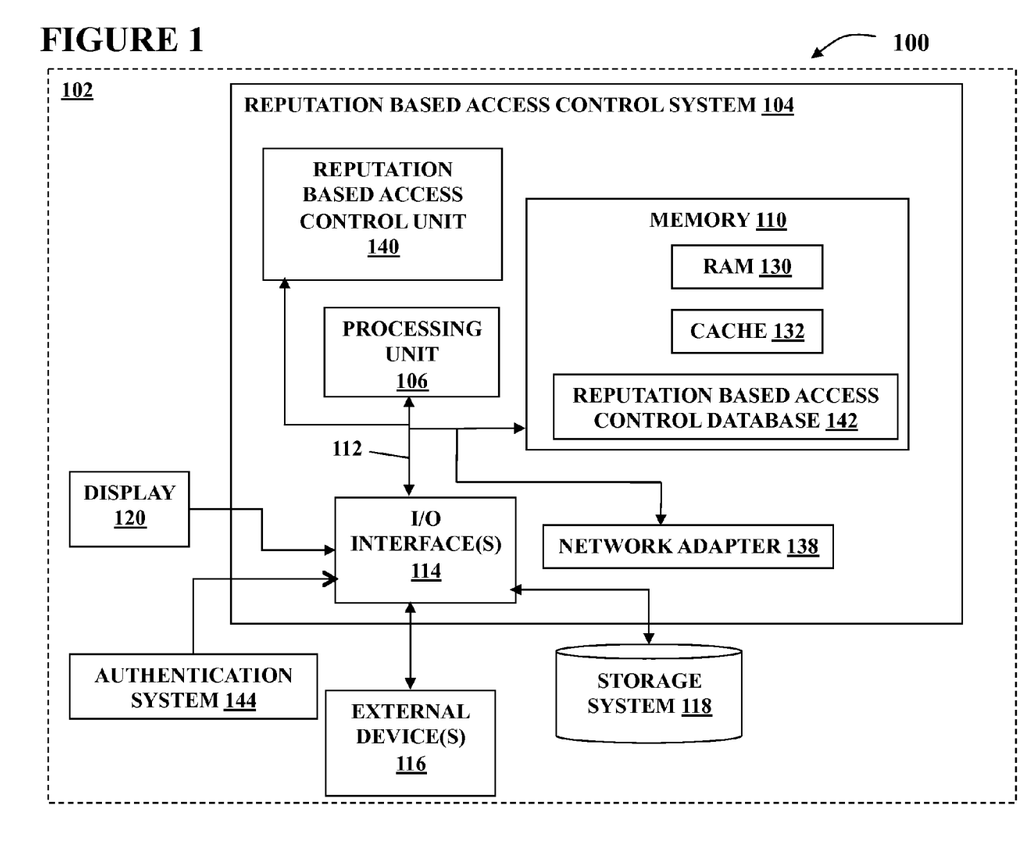
FIG. 1 shows a data processing system suitable for implementing an embodiment a reputation based access control system of the present of the present invention.

A data processing system 100, such as computer system 102 shown in FIG. 1, suitable for storing and/or executing program code of the present invention may include a reputation based access control system 104 having at least one processor (processing unit 106) coupled directly or indirectly to memory 110 through a system bus 112. Memory 110 can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. It may also include a reputation based access control database 142 for storing reputation information of subjects. Input/output or I/O devices (external devices 116) (including but not limited to keyboards, displays (display 120), pointing devices, etc.) can be coupled to the system either directly or through intervening I/O controllers (I/O interface(s) 114). A reputation based access control unit 140 may also be coupled to system bus 112.

This system utilizes an authentication system 144 (biometric, challenge/response, etc.) to identify a subject. Once the identity is determined, access to a resource is determined by reputation based access control unit 140. (The determination of the resource may involve door locks, computer menus, etc.). The system uses predetermined associations between the resource and security (e.g., trustworthiness) contexts to determine the subject's reputation in those contexts. The system then interfaces with a reputation assessment system (such as reputation based access control unit 140) to gauge the subject's reputation in these contexts. If the subject's reputation (as stored in reputation based access control database 142) meets the predetermined limits for reputation in those contexts for that resource (as stored in reputation based access control database 142), the subject is allowed access to the resource. Otherwise access is denied and the proper agents are notified.

Figure 2:
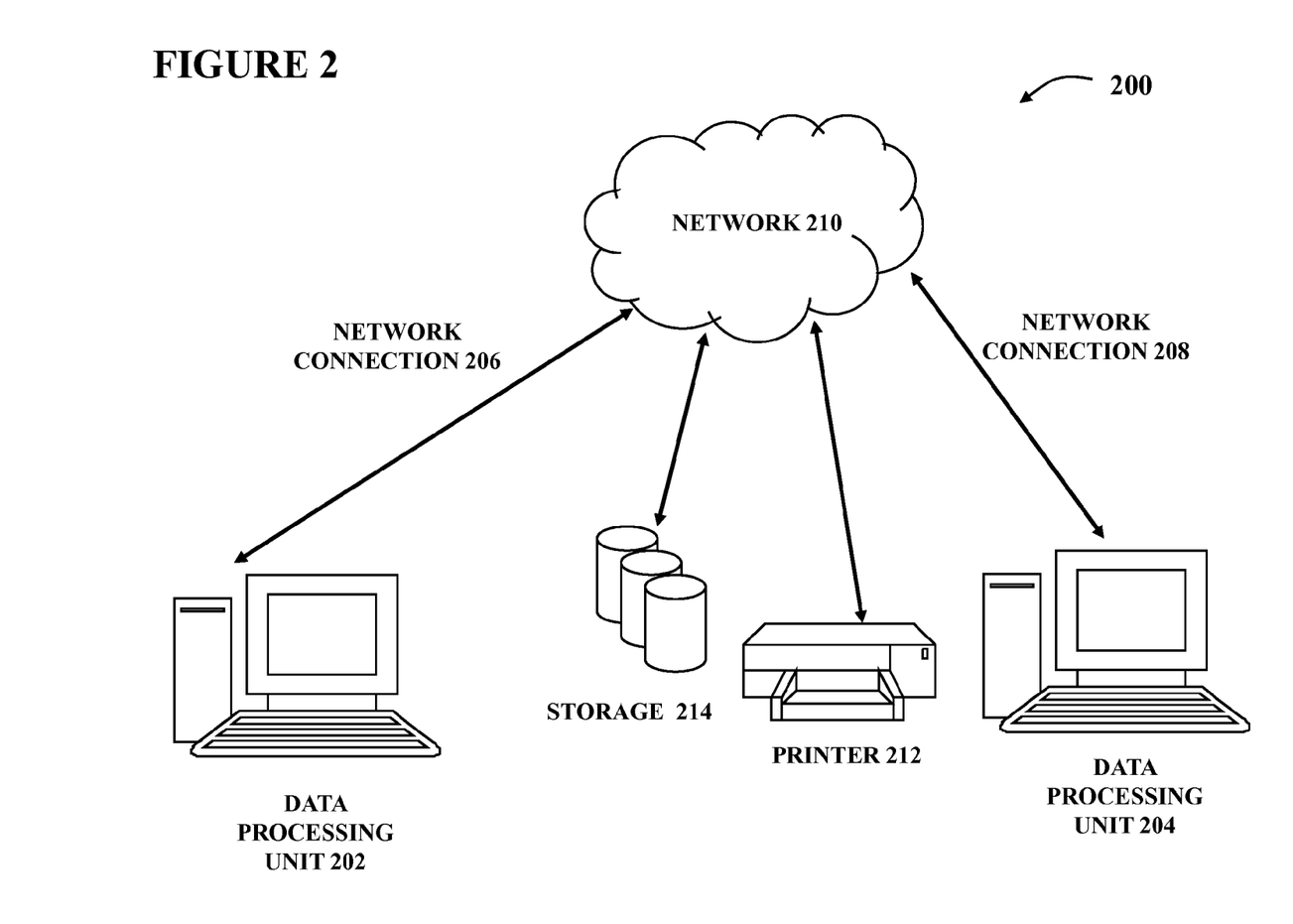
FIG. 2 shows a network that would work with an embodiment of the present invention.

Network adapters (network adapter 138) may also be coupled to the system 200 to enable the data processing system (as shown in FIG. 2, data processing unit 202) to become coupled through network connections (network connections 206, 208) to other data processing systems (data processing unit 204), remote printers (printer 212) and/or storage devices (storage 214) or other devices through intervening private and/or public networks (network 210).

Figure 3:
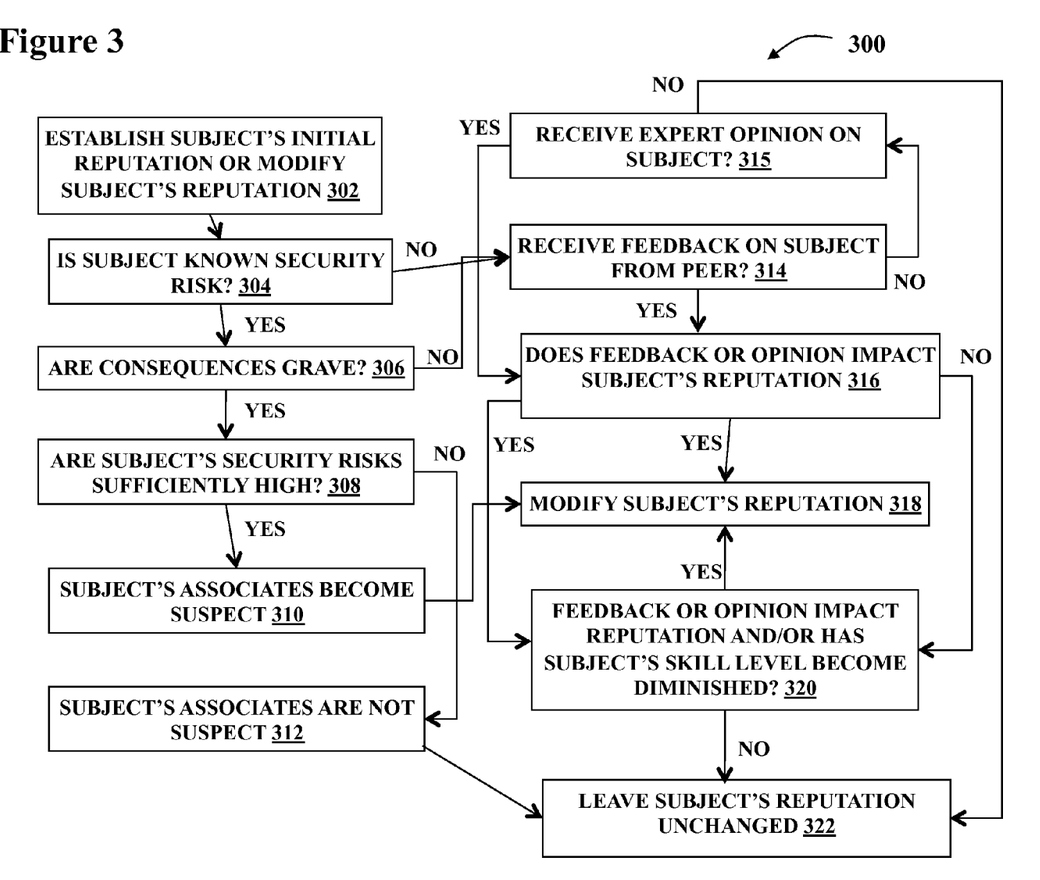
FIG. 3 illustrates one embodiment of a method for the establishment and subsequent modification of a subject's reputation in a reputation based access control system.

FIG. 3 illustrates one embodiment of a method 300 of the present invention for the establishment and subsequent modification, if necessary, of a subject's reputation information in a reputation based access control system. For purposes of this document, a "subject" may be a person, a device, software or anything that can request access to a system resource. "Subject reputation information" may be information, or data relating to the subject, such as attributes, characteristics, history (prior actions), associates, associates' history, aspects, traits, character, etc., and may be grouped into categories such as trustworthiness and skill level but there may be others as well. A "resource", for purposes of this document, may be a data item, a building or any other resource that may need to have controlled access. A "controlled resource" may be a resource that has an access policy for accessing the resource. At 302, the subject's reputation information may initially be established and subsequently be modified. Furthermore, the present invention can provide for more of a simultaneous assessment of multiple reputation factors than a stepwise decision tree. For example, a policy might state that if the person has a clearanceReputation>Secret AND skillReputation>Expert AND peerTrust>Honest, then the subject may access the controlled resource. If access is denied because the person was trying to do something unauthorized, then that person's trust score might be diminished. At 304, it is determined whether the subject is a known security risk and, if so, it is determined whether the consequences are grave at 306. Examples of consequences being grave may be that access to a requested resource by a known security risk (e.g., access to highly confidential information, such as customer lists, "secret formulas", "black box" projects located within buildings, by a subject who is a known security risk may cause irreparable damage to a company or enterprise) may cause extensive damage to a company or resource owner. If such consequences are grave, it is determined whether the subject's security risks are sufficiently high as compared to the possible consequences at 308 and, if so, subject's associates become suspect at 310 and, at 318, the subject's reputation is modified to indicate that subject's associates have become suspect. If not, at 312, the subject's reputation remains unchanged at 322.

If, at 304, subject is determined to not be a security risk, it is determined whether feedback has been received from a peer of the subject as to, e.g., the subject's skill or trustworthiness, at 314. If feedback from a peer has been received, it is evaluated and determined, at 316, whether the feedback impacts the reputation of the subject. If so and it relates to skill, it is determined whether the subject's skill level has been diminished at 320. If so, the subject's reputation is modified at 318. If not, the subject's reputation remains unchanged at 322. If, at 316, it is determined that the feedback impacts the reputation of the subject and it does not relate to skill, the subject's reputation is modified at 318 and stored. If, at 314, it is determined that no feedback from a peer has been received, it is determined, at 315, whether an expert opinion on the subject has been received and, if not, the subject's reputation remains unchanged at 322. If so, it is determined, at 316, whether the expert opinion impacts the reputation of the subject. If not, the subject's reputation remains unchanged at 322. If, at 316, it is determined that the expert opinion impacts the reputation of the subject, the subject's reputation is modified at 318 and stored.

It should be noted that information related to the subject's reputation, e.g., the subject's associates, subject's security risk, consequences, etc., may be stored in databases in the reputation based access control system shown in FIG. 1 and the processing of that information may be performed in the reputation based access control system shown in FIG. 1.

Figure 4:
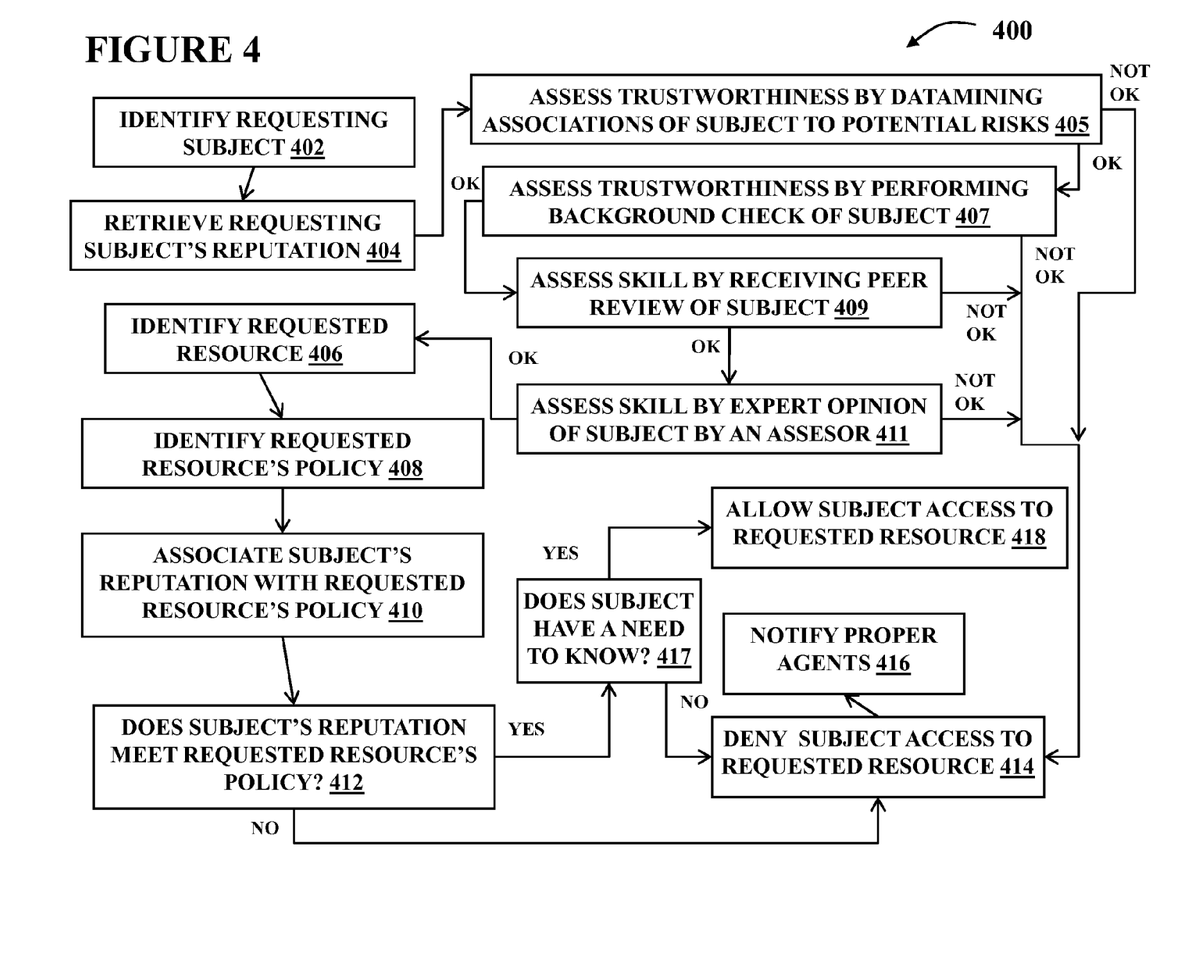
FIG. 4 illustrates one embodiment of a method of the present invention in a reputation based access control system for determining whether a requesting subject may or may not have access to a requested controlled resource.

FIG. 4 illustrates one embodiment of a method 400 of the present invention in a reputation based access control system for determining whether a requesting subject may or may not have access to a controlled resource. At 402, a requesting subject is identified and, at 404, the requesting subject's reputation is retrieved. At 405, the trustworthiness of the requesting subject is assessed by data mined associations of the requesting subject and evaluating that assessment using association policies. If the assessment is positive, that is, the trustworthiness value of the requesting subject based upon the data mining of requesting subject's associations exercise is acceptable, or "OK", at 407, the trustworthiness of the requesting subject is assessed by performing a background check of the requesting subject. If the assessment is positive, that is, the trustworthiness value of the requesting subject based upon the background check of the requesting subject is acceptable, or "OK", at 409, the skill of the requesting subject is assessed by reviewing and evaluating a peer review of the requesting subject. If the assessment is positive, that is, the skill value of the requesting subject based upon the peer review of the requesting subject is acceptable, or "OK", at 411, the skill of the requesting subject is assessed by examining an expert opinion by an assessor of the requesting subject's skill level. If the assessment is positive, that is, the skill value of the requesting subject based upon an expert opinion performed digitally by an assessor of the requesting subject is acceptable, or "OK", at 406, the requested controlled resource is identified. If at 405, 407, 409 or 411, the trustworthiness or skill values of the requesting subject are not acceptable, or "NOT OK", at 414, the requesting subject is denied access to the requested controlled resource, the requesting subject's reputation information may be updated and the proper agents are notified at 416.

It should be noted that the assessment of trustworthiness by data mining associations of the requesting subject and the assessment of trustworthiness by performing a background check of the requesting subject may be done in parallel rather than the serial manner that is illustrated in FIG. 4, one assessment may be conducted and not the other, or it may be that neither is conducted. It should be noted that the digital on-line background checks performed by the present invention do not replace the types of background checks performed by intelligence organizations. They actually supplement them. In fact, a national security background check could be another reputation point. Likewise, the assessment of skill by reviewing, assessing and evaluating a peer review of the requesting subject and the assessment of skill by reviewing, assessing and evaluating an expert opinion of the requesting subject may be done in parallel rather than the serial manner that is illustrated in FIG. 4, one assessment may be conducted and not the other, or it may be that neither is conducted. Also, trustworthiness assessment may be conducted on other information relating to the requesting subject such as the requesting subject's or the requesting subject's associations' actions. Likewise, skill assessment may be conducted on other information relating to the requesting subject, such as whether the requesting subject is impaired, such that access to the requested controlled object may be denied.

At 406, the requested controlled resource is identified and, at 408, its access policy is retrieved. At 410, the requesting subject's reputation information is associated with the requested controlled resource's access policy. At 412, it is determined whether the requesting subject's reputation information meets the requested controlled resource's access policy and, if so, at 417, it is determined as to whether the requesting subject has a "need to know" as requesting subject relates to the requested controlled resource. If the requesting subject has a "need to know" as the requesting subject relates to the requested controlled resource, at 418, the requesting subject is allowed to access the requested controlled resource. If, at 412, it is determined that the requesting subject's reputation information does not meet the requested controlled resource's access policy or, at 417, it is determined that the requesting subject does not have a "need to know" as requesting subject relates to the requested controlled resource, at 414, the requesting subject is denied access to the requested controlled resource, the requesting subject's reputation information may be updated and the proper agents are notified at 416.

Figure 5:
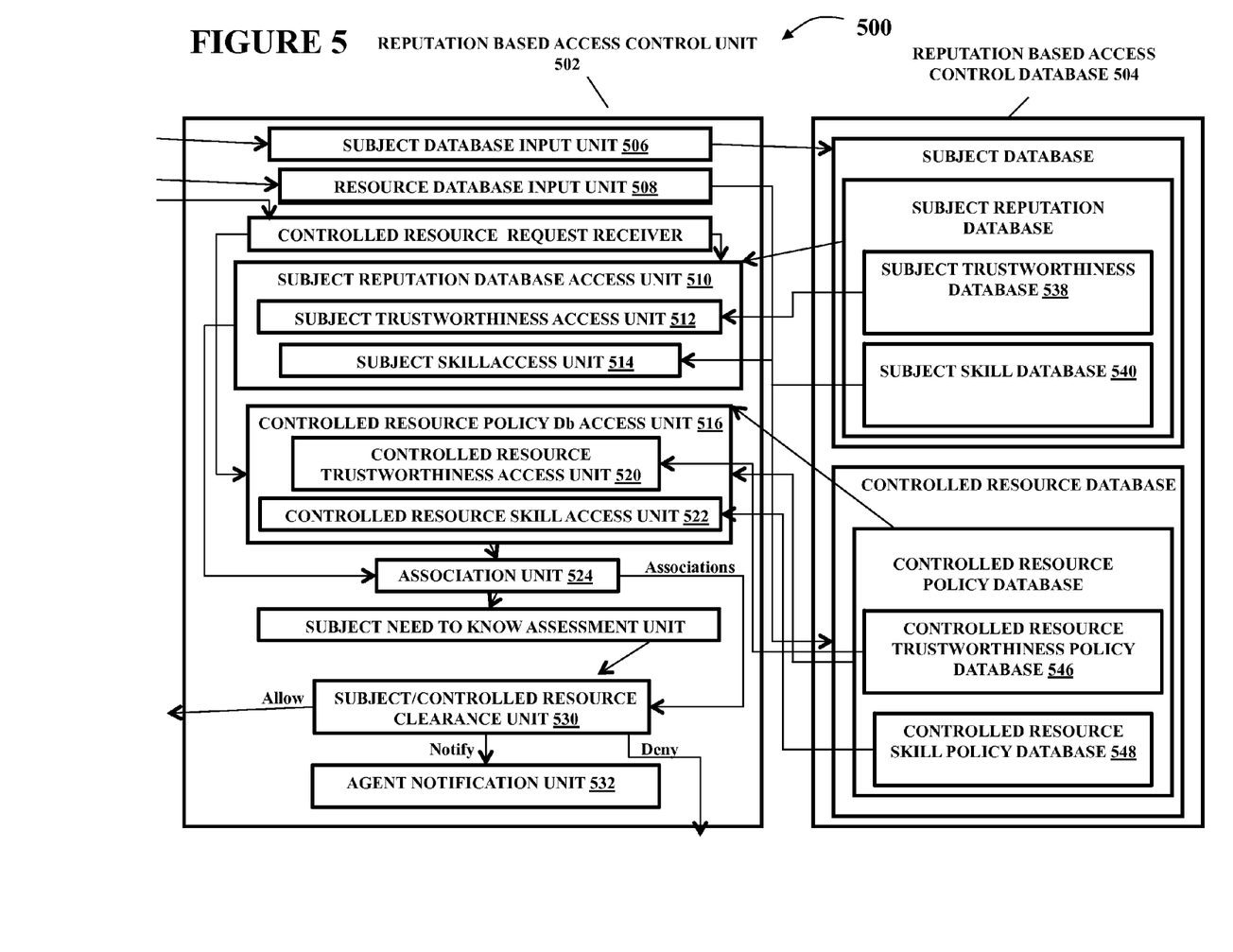
FIG. 5 illustrates one embodiment of the reputation based access control system of the present invention having a reputation based access control unit and a reputation based access control database.

FIG. 5 illustrates one embodiment of the reputation based access control system 500 of the present invention having a reputation based access control unit 502 and a reputation based access control database 504. Reputation based access control unit 502 may have a subject database input unit 506 for receiving reputation information relating to subjects and for storing the reputation information relating to subjects in reputation based access control database 504. The inputs may be received from outside reputation based access control system 500, e.g., by a subject's superior, or from within reputation based access control system 500 based upon analysis conducted within reputation based access control system 500. The input may be initial inputs for each subject's reputation or modifications to each subject's reputation. Reputation based access control unit 502 may further have a resource database input unit 508 for receiving access policy information relating to controlled resources and for storing in reputation based access control database 504. The inputs may be received from outside reputation based access control system 500, e.g., by a controlled resource owner, or from within reputation based access control system 500 based upon analysis conducted within reputation based access control system 500. The input may be initial access policy inputs for each controlled resource or modifications to each controlled resource's access policy. An example of subject reputation information, or data, may be information (such as criminal background of subject or subject's associations, subject's or subject's associations' previous actions, etc.) relating to each subject's level of trustworthiness for security purposes that may be determined by such methods as data mining relating to each subject or by doing a background check on the subject. Other methods may be used as well. Another example of subject reputation information may be information relating to each subject's skill level (skill history, subject's or subject's associations' previous actions, etc.) for determining capabilities of the subject that may be determined by such methods as reviewing/analyzing peer reviews related to the subject or reviewing/analyzing expert opinions related to the subject. Other methods may be used as well.

Reputation based access control unit 502 may further have a subject database access unit 510 for retrieving reputation information relating to subjects from reputation based access control database 504. Subject database access unit 510 may have subject trustworthiness access unit 512 for retrieving trustworthiness information relating to subjects from subject trustworthiness database 538 in reputation based access control database 504 and subject skill access unit 514 for retrieving skill information relating to subjects from subject skill database 540 in reputation based access control database 504.

Reputation based access control unit 502 may further have a controlled resource access policy database access unit 516 for retrieving access policy information relating to controlled resources from reputation based access control database 504. Controlled resource policy database access unit 516 may have controlled resource trustworthiness policy access unit 520 for retrieving access policies of controlled resources and trustworthiness information from controlled resource trustworthiness policy database 546 in reputation based access control database 504 and controlled resource skill policy access unit 522 for retrieving skill level access policy information for each controlled resource from controlled resource skill policy database 548 in reputation based access control database 504.

Reputation based access control unit 502 may further have a requesting subject/requested controlled resource access policy association unit 524. Requesting subject/requested controlled resource access policy association unit 524 associates requesting subject reputation information with requested controlled resource access policy and passes this information to requesting subject/requested controlled resource policy clearance unit 530. Requesting subject/requested controlled resource policy clearance unit 530 examines and analyzes the requesting subject/requested controlled resource access policy associations and allows or denies access to the controlled resource based upon the analysis. Upon denial, it may also notify agents via agent notification unit 532.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for reputation based access control for accessing requested controlled resources by requesting subjects based upon the reputation of the requesting subject and the requested controlled resource's access policy, it is understood that the invention further provides various alternative embodiments. For example, in one embodiment, the invention provides a computer-readable/useable medium that includes computer program code to enable a system for accessing requested controlled resources by requesting subjects based upon the reputation of the requesting subject and the requested controlled resource's access policy. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for reputation based access control for accessing requested controlled resources by requesting subjects based upon the reputation of the requesting subject and the requested controlled resource's access policy. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a Solution Integrator, could offer to deploy a computer infrastructure for reputation based access control for accessing requested controlled resources by requesting subjects based upon the reputation of the requesting subject and the requested controlled resource's access policy. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method in a computer system having a network input/output (I/O), a central processing unit (CPU), a reputation based access control unit and one or more databases including a reputation based access control database, the method for assessing whether to allow or deny access to a requested controlled resource having a policy from a request from a requesting subject having a reputation based upon the requesting subject's reputation and the requested controlled resource's policy, the method comprising:

identifying the requesting subject;
retrieving the requesting subject's reputation stored as a virtual attribute in a reputation-based access control database, wherein the requesting subject's reputation comprises a value for skill for operating with the requested controlled resource, and wherein the requesting subject's reputation is modified in each of the following cases: as the reputation of an associate of the requesting subject changes, and following an indication from a peer of the requesting subject that the requesting subject's value for skill is diminished;
identifying the requested controlled resource;
retrieving the requested controlled resource's policy;
associating the requesting subject's reputation with the requested controlled resource's policy;
determining if the requesting subject's reputation meets the requested controlled resource's policy;
if the requesting subject's reputation meets the requested controlled resource's policy, allowing the requesting subject access to the requested controlled resource; and
if the requesting subject's reputation does not meet the requested controlled resource's policy, denying the requesting subject access to the requested controlled resource.

2. The method as defined in claim 1 wherein the requesting subject's reputation comprises a value for trustworthiness, the method further comprising assessing the trustworthiness of the requesting subject.

3. The method as defined in claim 2 further comprising determining the value for trustworthiness of the requesting subject by data mining associations of the requesting subject and performing a background check of the requesting subject.

4. The method as defined in claim 2 further comprising determining the value for trustworthiness of the requesting subject by assessing actions previously taken by the requesting subject.

5. The method as defined in claim 2 further comprising determining the value for trustworthiness of the requesting subject by assessing actions previously taken by associates of the requesting subject.

6. The method as defined in claim 1 the method further comprising assessing the skill of the requesting subject.

7. The method as defined in claim 6 further comprising determining the value for skill of the requesting subject by receiving peer feedback of the requesting subject and receiving an expert opinion by an assessor of the requesting subject.

8. The method as defined in claim 6 further comprising determining the value for skill of the requesting subject by assessing actions previously taken by the requesting subject.

9. A system having a network input/output (I/O), a central processing unit (CPU) and one or more databases for assessing whether to allow or deny access to a requested controlled resource, the requested controlled resource having an access policy, based upon a request for access to the requested controlled resource from a requesting subject, having a reputation, the assessment being based upon the requesting subject's reputation and the requested controlled resource's access policy, the system comprising:

a reputation based access control database for storing a policy for access to one or more controlled resources, the reputation based access control database comprising:
a subject reputation database for storing, as a virtual attribute, subject reputation information relating to one or more requesting subjects, wherein the subject reputation information comprises a value for skill for operating with the requested controlled resource, and wherein the requesting subject's reputation is modified in each of the following cases: as the reputation of an associate of the requesting subject changes, and following an indication from a peer of the requesting subject that the requesting subject's value for skill is diminished; and
a controlled resource policy database for storing one or more access policies of one or more requested controlled resources;
a reputation based access control unit for controlling access to the controlled resources, the reputation based access control unit comprising:
a subject reputation database access unit, connected to the subject reputation database, for retrieving the subject reputation information stored in the subject reputation database;
a controlled resource policy database access unit, connected to the controlled resource policy database, for retrieving the access policy of the one or more requested controlled resources;

a controlled resource request receiver for receiving requests from subjects and for forwarding the received requests to the subject reputation database access unit and the controlled resource policy database access unit;

an association unit for associating the subject reputation information of the requesting subject and the subject reputation information relating to the requesting subject; and a subject/controlled resource clearance unit for determining, based upon the association between the requesting subject's subject reputation information and the requested controlled resource's policy, clearing or not clearing the requesting subject for access to the controlled resource, wherein the requesting subject is allowed access to the requested controlled resource if the requesting subject's subject reputation information meets the policy of the requested controlled resource and is denied access to the requested controlled resource if the requesting subject's subject reputation information does not meet the policy of the requested controlled resource.

10. The system as defined in claim 9 further comprising an agent notification unit for notifying an agent if the subject/controlled resource clearance unit denies the requesting subject access to the requested controlled resource.

11. The system as defined in claim 10 further comprising:
a subject trustworthiness database for storing information relating to a value for trustworthiness of requesting subjects;
a subject trustworthiness database access unit for accessing information relating to the trustworthiness of a requesting subject;
a controlled resource trustworthiness database for storing information relating to the trustworthiness access policy of controlled resources; and
a controlled resource trustworthiness policy database access unit for retrieving information relating to the trustworthiness access policy of the requested controlled resource, wherein the association unit associates the information relating to the trustworthiness of the requesting subject to information relating to the trustworthiness access policy of the requested controlled resource.

12. The system as defined in claim 10 further comprising:
a subject skill database for storing information relating to the skill of requesting subjects;
a subject skill database access unit for retrieving information relating to the skill of the requesting subject;
a controlled resource skill policy database for storing policy information relating to the skill of controlled resources; and
a controlled resource skill policy database access unit for retrieving policy information relating to the skill policy of the requested controlled resource, wherein the association unit associates the information relating to the skill of the requesting subject to information relating to the skill policy of the requested controlled resource.

13. The system as defined in claim 12 further comprising a requesting subject need to know assessment unit for assessing information relating to the requesting subject's need to know as the requesting subject relates to the controlled resource and, if the requesting subject has a need to know relating to the controlled resource or, if the requesting subject has no need to know relating to the controlled resource, for so notifying the subject/controlled resource clearance unit as to whether the requesting subject has a need to know.

14. The system as defined in claim 13 further comprising a subject database input unit for receiving information relating to the reputation of subjects and a resource database input unit for receiving information relating to the reputation policies of controlled resources.

15. A computer program product embodied in a computer readable physical storage device for operating in a system comprising a network input/output (I/O), a central processing unit (CPU), a reputation based access control unit and one or more databases including a reputation based access control database, the method for assessing whether to allow or deny access to a requested controlled resource, having an access policy, from a request from a requesting subject, having a reputation, based upon the requesting subject's reputation and requested controlled resource's access policy, the method comprising:
identifying the requesting subject;
retrieving the requesting subject's reputation stored as a virtual attribute in a reputation-based access control database, wherein the requesting subject's reputation is modified in each of the following cases: as the reputation of an associate of the requesting subject changes, and following an indication from a peer of the requesting subject that the requesting subject's value for skill is diminished;
identifying the requested controlled resource;
retrieving the requested controlled resource's access policy;
associating the requesting subject's reputation with the requested controlled resource's access policy;
determining if the requesting subject's reputation meets the requested controlled resource's access policy;
if the requesting subject's reputation meets the requested controlled resource's access policy, allowing the requesting subject access to the requested controlled resource; and
if the requesting subject's reputation does not meet the requested controlled resource's access policy, denying the requesting subject access to the requested controlled resource.

16. The computer program product as defined in claim 15 wherein the requesting subject's reputation comprises a value for trustworthiness and the requested controlled resource has a requirement related to trustworthiness and wherein the method further comprises comparing the requesting subject's trustworthiness value with the requested controlled resource's trustworthiness value.

17. The computer program product as defined in claim 15 wherein the requested controlled resource has a requirement related to skill and wherein the method further comprises comparing the requesting subject's skill value with the requested controlled resource's skill value.

18. A method for deploying a computer infrastructure in a system comprising a network input/output (I/O), a central processing unit (CPU), a reputation based access control unit and one or more databases including a reputation based access control database, for implementing a process for assessing whether to allow or deny access to a requested controlled resource having an access policy from a request from a requesting subject having a reputation based upon the requesting subject's reputation and requested controlled resource's access policy, the process comprising:
identifying the requesting subject;
retrieving the requesting subject's reputation stored as a virtual attribute in a reputation-based access control database, wherein the requesting subject's reputation is modified in each of the following cases: as the reputation of an associate of the requesting subject changes, and following an indication from a peer of the requesting subject that the requesting subject's value for skill is diminished;

identifying the requested controlled resource;

retrieving the requested controlled resource's access policy;

associating the requesting subject's reputation with the requested controlled resource's access policy;

determining if the requesting subject's reputation meets the requested controlled resource's access policy;

if the requesting subject's reputation meets the requested controlled resource's access policy, allowing the requesting subject access to the requested controlled resource; and if the requesting subject's reputation does not meet the requested controlled resource's access policy, denying the requesting subject access to the requested controlled resource.

19. The method for deploying a computer infrastructure as defined in claim 18 wherein the computer infrastructure further comprises a subject trustworthiness database for storing information relating to the trustworthiness of requesting subjects, a subject trustworthiness database access unit, a controlled resource trustworthiness database for storing a trustworthiness access policy for controlled resources, a controlled resource trustworthiness policy database access unit and an association unit and wherein the process further comprises:

retrieving information relating to the trustworthiness of the requesting subject;

retrieving information relating to the trustworthiness access policy of the requested controlled resource; and associating the information relating to the trustworthiness of the requesting subject to the information relating to the trustworthiness access policy of the requested controlled resource.

* * * * *